Oct. 10, 1950     H. E. KALLMANN     2,524,807
OPTICAL AUTOMATIC RANGE DETERMINING DEVICE
Filed March 28, 1947     3 Sheets-Sheet 1
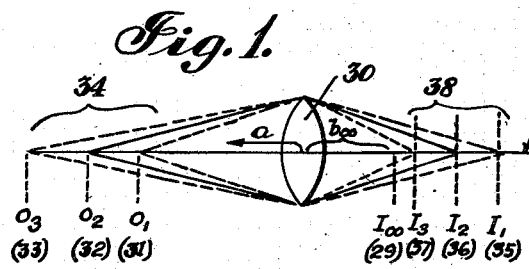
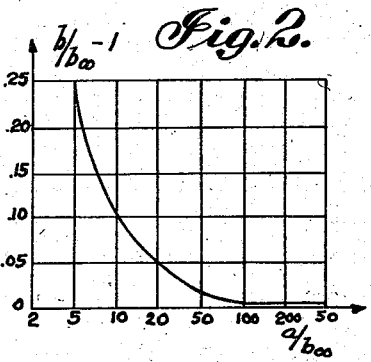
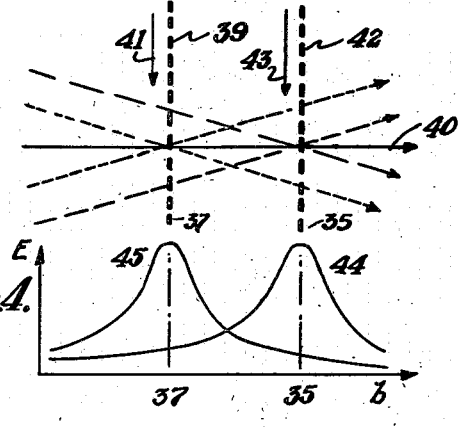
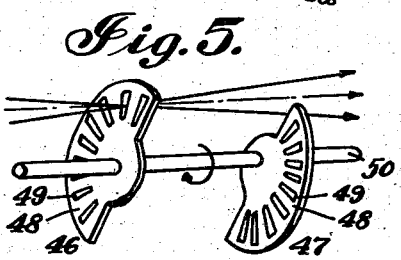
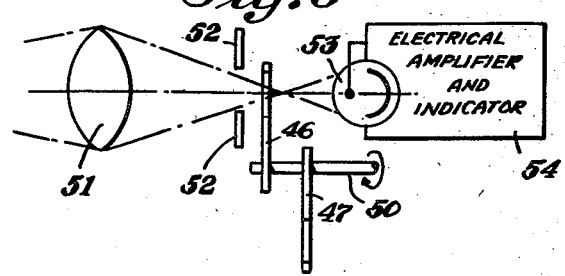
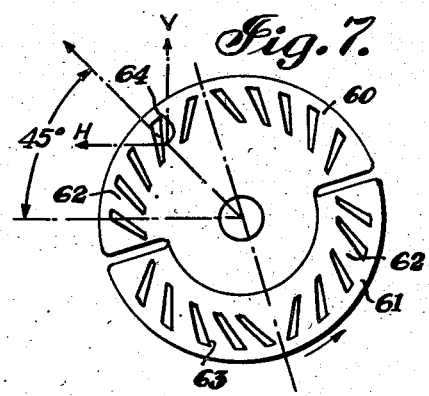
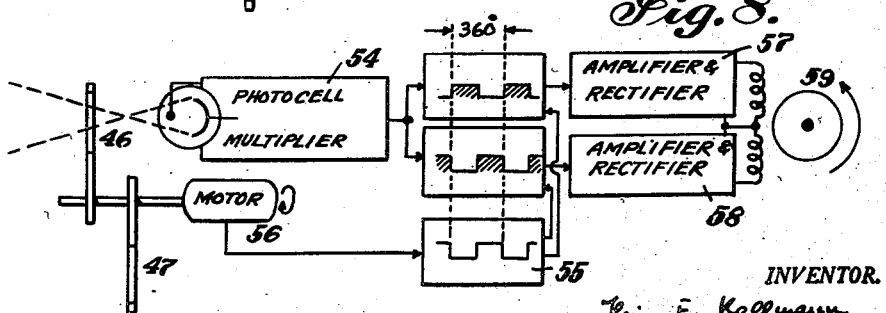
INVENTOR.
Heinz E. Kallmann
BY Oct. 10, 1950     H. E. KALLMANN     2,524,807
OPTICAL AUTOMATIC RANGE DETERMINING DEVICE
Filed March 28, 1947     3 Sheets-Sheet 2
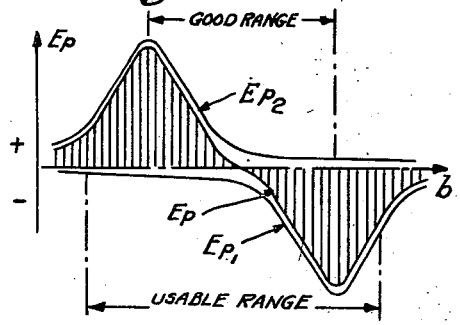
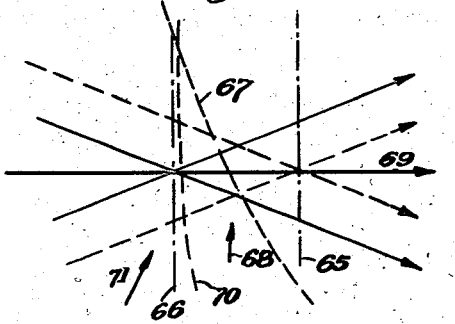
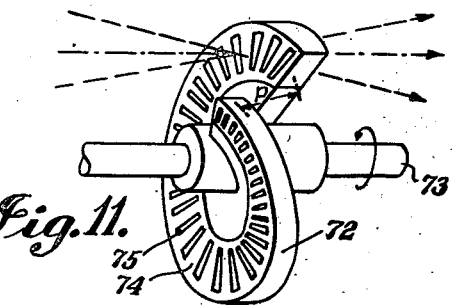
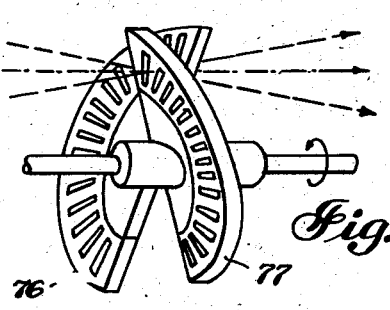
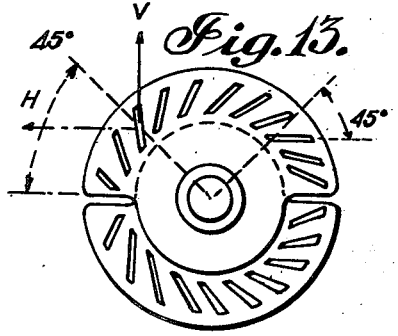
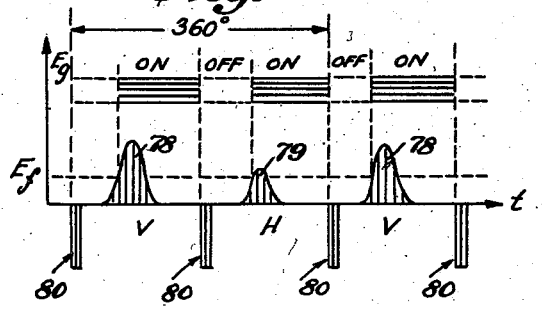
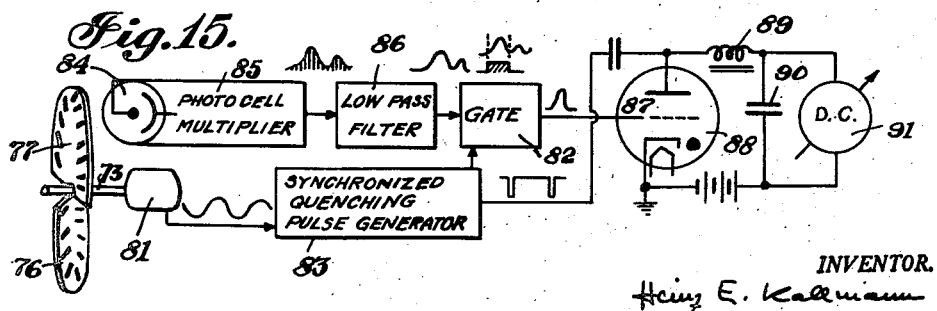
INVENTOR.
Heinz E. Kallmann
BY

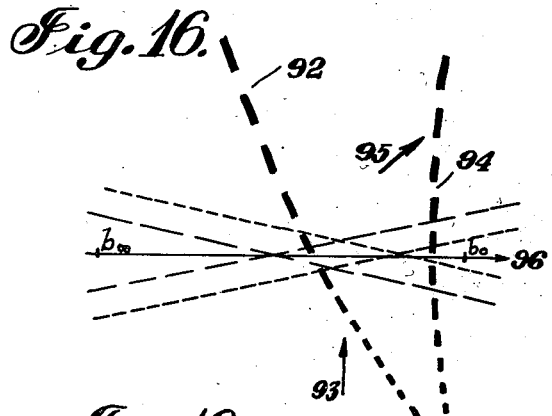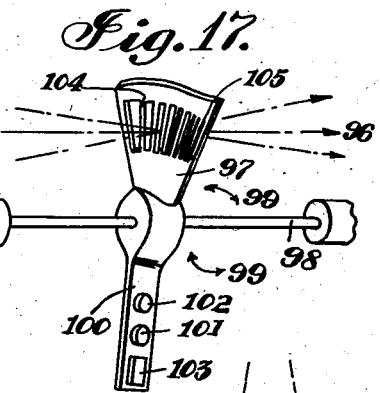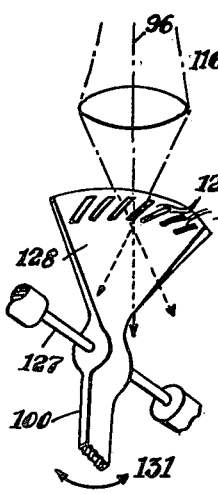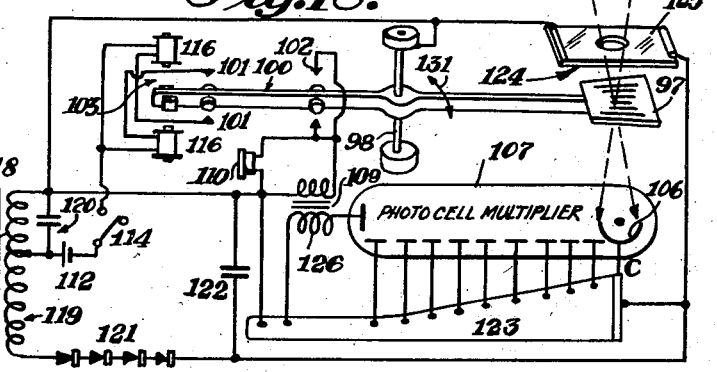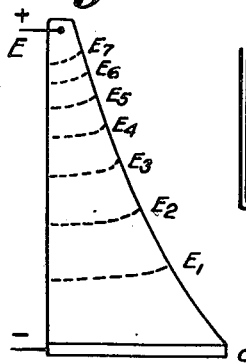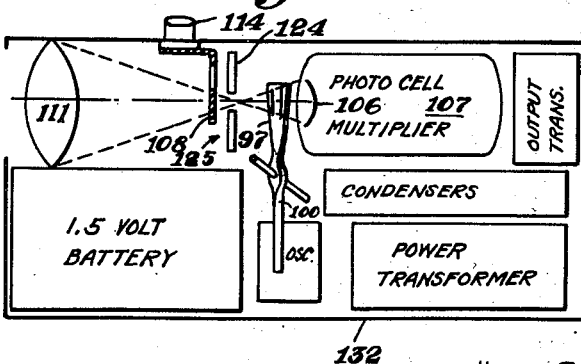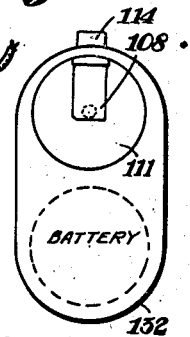

Patented Oct. 10, 1950

2,524,807

UNITED STATES PATENT OFFICE 2,524,807

OPTICAL AUTOMATIC RANGE DETERMINING DEVICE

Heinz E. Kallmann, New York, N. Y.

Application March 28, 1947, Serial No. 737,825

8 Claims. (Cl. 88—1)

My present invention relates to automatic optical ranging devices of various types.

More particularly, my present invention relates to optical focusing devices, optical range finder and focus controlling systems, and optical range determining devices giving audible signals.

Still more particularly, the devices and apparatus proposed by me might serve for different purposes, as for instance:

To perform automatic fine-focusing of devices that are otherwise, perhaps manually or by remote control, focused only roughly;

To perform automatic ranging of single, or several, objects, either indicating their distances or controlling a focus servo system as may be used with photographic or television cameras; and To serve as blind-aid devices and other obstacle locators.

It is an object of my present invention to provide devices and apparatus of the above type which are particularly simple in construction and easy to operate.

It is a further object of my present invention to provide apparatus and devices of the character described above which are adapted for automatic operation and continuous indication of the desired data or for automatic control and operation of certain means, e. g. servo-control systems, in accordance with indications obtained by the respective apparatus or devices.

With the above objects in view, all apparatus and devices constructed in accordance with my present invention include in combination a series of elements, namely An optical imaging system having an exit focal plane and extending rearwards therefrom an image space into which it transforms its object space.

A photo-sensitive device arranged in this image space of the optical imaging system and adapted to receive imaging light bundles from this imaging system; and At least one partly opaque light intercepting means composed of intercepting elements of a size comparable to the circle of confusion of the images formed by the above described optical imaging system arranged and constructed so as to be adapted to intercept each of the rays of the above mentioned imaging light bundles in periodical motion across them at different distances between the exit focal plane of the optical imaging system and the photo-sensitive device.

The novel features which I consider as characteristic for my invention are set forth in particular in the appended claims. The invention itself, however, will be best understood from the following theoretical considerations and descriptions of various embodiments in connection with the accompanying drawings, in which:

Fig. 1 is a diagram showing an optical imaging system and imaging light bundles;

Fig. 2 is a diagram showing the relation between object distance and image distance for the optical imaging system shown in Fig. 1;

Fig. 3 is a schematic view of two light intercepting grating members forming part of an apparatus according to my present invention;

Fig. 4 is a diagram showing the amplitude of the signal as a function of the axial position of the light intercepting grating members shown in Fig. 3;

Fig. 5 is a perspective view of two semi-circular light intercepting vanes forming part of a focusing device according to my present invention;

Fig. 6 is a schematic view of the optical part of a focusing device of the type proposed by me, provided with light intercepting vanes of the type shown in Fig. 5;

Fig. 7 is an axial view of light intercepting vanes representing a modification of the light intercepting vanes shown in Fig. 5;

Fig. 8 is a block diagram of a focusing device according to my present invention, embodying light intercepting vanes as shown in Fig. 5 and an optical arrangement as shown in Fig. 6;

Fig. 9 is a diagram explaining operation of a focusing device of the type shown in Fig. 8;

Fig. 10 is a schematic view of light intercepting means forming part of a range finder device according to my present invention;

Fig. 11 is a perspective view of a helical light intercepting vane forming part of a range finder device according to my present invention;

Fig. 12 is a perspective view of a twin-helical vane, a modification of the one shown in Fig. 11;

Fig. 13 is an axial view of another twin-helical vane adapted to be used in a range finder device according to my present invention;

Fig. 14 is a diagram showing the operation of a range finder device according to my present invention;

Fig. 15 is a block diagram of a range finder device according to my present invention;

Fig. 16 is a schematic view of light intercepting means forming part of an audible range determining device called also audible obstacle locator according to my present invention;

Fig. 17 is a perspective view of a light intercepting vane adapted to be used in an audible obstacle locator according to my present invention;

Fig. 18 is a view of the optical parts of an audible obstacle locator according to my present invention, combined with a suitable circuit diagram;

Fig. 19 is a view of a modification of some optical parts of Fig. 18;

Fig. 20 is an enlarged view of the voltage divider shown in Fig. 18;

Fig. 21 is a schematic longitudinal section through an audible obstacle locator according to my present invention; and Fig. 22 is a schematic front view of the obstacle locator shown in Fig. 21.

In order to facilitate the explanation of my present invention, I will in the following—before proceeding with a detailed description of various embodiments of my invention—briefly discuss the basic theoretical considerations upon which my invention is based:

The optical design of a device according to my present invention is governed by the concepts of longitudinal magnification $\Gamma$ and the angle of convergence $\beta$ of the imaging light bundles.

The optical imaging element of an arrangement of the type proposed by me may be any lens or lens combination or any reflective system of large aperture capable of producing real images with high resolution over a small field near the optical axis. Thus, referring to Fig. 1, the imaging element might, for instance, be a lens 30 with optical axis 40 forming real images of the objects $O_1$ (31), $O_2$ (32), and $O_3$ (33) in the object space 34 at the left, in the image planes $I_1$ (35), $I_2$ (36), and $I_3$ (37) in the image space 38 at the right.

As is well known, if $a$ represents the distance of an object $O$ from the center of the lens 30 and $b\infty$ the distance from the lens 30 to the image $I\infty$ (29) of an infinitely distant object $O\infty$, then any image distance $b$ is related to the corresponding object distance $a$ by $$b = \frac{ab\infty}{a - b\infty} \quad (1)$$

Thus, images of objects are displaced from the "focal distance" $b\infty$ of the lens 30 by a distance $(b-b\infty)$ that grows the larger the nearer the object $O$ approaches the lens 30. Expressing this displacement in units of $b\infty$ as $$\frac{b - b\infty}{b\infty} = \left(\frac{b}{b\infty} - 1\right)$$

and the object distance $a$ in units of $b\infty$ as $$\left(\frac{a}{b\infty}\right)$$

leads to the universal relation $$\left(\frac{b}{b\infty} - 1\right) = \frac{1}{\left(\frac{a}{b\infty}\right) - 1} \quad (2)$$

which is plotted in Fig. 2.

The term longitudinal magnification $\Gamma$ describes the change in the image distance $b$ with change of the object distance $a$; it can be shown that, irrespective of the type of optical system, $$\Gamma = \frac{db}{da} = \frac{b - b\infty}{a - b\infty} \quad (3)$$

From the Equations 1 and 3 it follows that $$\Gamma = \frac{b\infty^2}{(a - b\infty)^2} = \frac{b^2}{a^2}$$

Thus, for an object distance $a$ that is large compared with the focal length $b\infty$, the longitudinal magnification grows in proportion to nearly the square of the focal length $b\infty$ of a lens system; the separation of image planes of different objects therefore increases rapidly with increase of focal length.

The imaging light bundles are shown in Fig. 1 in broken lines for the relatively close object $O_1$ (31), in solid lines for the more distant object $O_2$ (32), and in dotted lines for the most distant object $O_3$ (33). All these bundles converge from a maximum diameter at the lens 30, equal to the diameter D of the lens, to a minimum diameter in the image planes $I_1$ (35), $I_2$ (36), and $I_3$ (37), respectively.

For an ideal lens and infinitely short wave length of light, this minimum diameter is zero; in practical cases, that is for a good lens and visible light, the minimum diameter, i. e. the diameter of the "circle of confusion" is of the order of $1/1000$ of the lens diameter D.

In a device of the type proposed by me, object distances are identified by the location of the corresponding image planes, that is where the imaging light bundles have minimum diameter. Identification of an image plane by the diameter of the imaging light bundle is evidently the easier the wider the angle of convergence of that light bundle. This angle is $\beta = 2 \tan^{-1}(D/2b)$; thus for distant objects, the angle $\beta$ is approximately equal to $(D/b\infty)$. Since, then, image plane discrimination is the easier the larger the separation of these planes, depending on $\Gamma$, and the larger the angle $\beta$, the resultant requirement is that the product $\beta \Gamma a Db\infty$ be large, that is that both the diameter and the focal length of the imaging lens 30 should be as large as other considerations such as weight and space permit.

The characteristic part of a device according to my present invention is the arrangement by which sharp images are located in the image space by moving a pattern of many small photosensitive probes across the imaging light beam. This method is illustrated in Fig. 3, in which the region near the image planes $I_1$ (35) and $I_3$ (37) of Fig. 1 is shown enlarged. Again, the broken lines outline the bundle imaging an object 31 not shown here and the dotted lines the bundle imaging an object 33 not shown here; these bundles have minimum diameters when passing through the planes 35 and 37, respectively.

Both bundles of light may now be intercepted in the plane 37 by a plane grating of wires 39 shown in Fig. 3. The orientation of these wires is assumed to be vertical to the optical axis 40 of lens 30. This grating of wires 39, may, for example be photosensitized and form thus the photo-sensitive surface of a photoelectric cell. Both the width of the wires and of the interstices between them may be of the order of the minimum diameter of the imaging light bundle.

If now the grating 39 is moved, in the direction of the arrow 41, across the bundles of light then it will be evident that the point image in the image plane 37 will alternatingly fall on, and in between, the photo-sensitive wires, giving rise to a pulse of photoelectric current each time a photo-sensitive wire crosses it, and no current whenever the point image falls between the wires. If, instead of a point source of light, a part of an extended object is imaged in the image plane 37, then each of the points making up the object will independently give rise to such photoelectric current pulse. If a very large number of arbitrarily arranged object points is imaged simultaneously on the photo-sensitive grating 39, then many arbitrarily phased pulse sequences will be added to make up the resulting photoelectric current and the concurrent process of averaging will then all but obliterate the pulse structure of the current. If a finite object is imaged on the photoelectric grating 39, then the averaging process will always be incomplete and the photoelectric current will still be pulse-modulated to a substantial extent.

On the other hand, the bundle of light focused in the image plane 35 will not give rise to any such pulse modulation in a photoelectric grating 39 located in the image plane 37. Since the diameter of this bundle of light covers at each moment a considerable number of both photo-sensitive wires and interstices, its contribution to the illumination of the photo-sensitive grating 39 will average to a substantially constant value even when the grating is moved. For equal width of wires and interstices, this amount will at any moment be equal to 50% of the whole of the bundle.

The effects of the two bundles of light would be reversed with respect to a similar photo-sensitive grating 42 moving in the image plane 35 in direction of arrow 43; the bundle focused in the plane 35 would in this case yield some pulse modulation and the other bundle none. If the movement of such a grating is at the constant speed $v$ in centimeters per second, and if there are $n$ photo-sensitive wires per centimeter of a grating, then the pulse modulation of the photoelectric current, due to the focused light bundle, will be of the frequency $$f = nv \text{ cycles per second} \quad (5)$$

Modulation of the photoelectric current of the frequency $f$ and its harmonics will be called in the following description a "signal," signifying the interception of a light bundle at or near its image plane by an interceptor grating. Depending on the angle of convergence $\beta$, the signal amplitude falls more or less rapidly if the plane of the sharp image is moved, in either direction, away from the plane of the interceptor grating. Curves shown in Fig. 4 in connection with Fig. 3 may indicate the strength of the signal E as a function of the position of the image plane relative to the interceptor plane. Two curves, 44 and 45, are shown, one each with its peak at the plane of an interceptor grating, curve 44 for an interceptor plane 42 at image plane 35, and curve 45 for an interceptor plane 39 at image plane 37.

I may mention here a number of variants and modifications of the above described arrangement for image plane identification according to my present invention.

(1) It is irrelevant whether the beams of light are stationary and the photo-sensitive grating is moved, or whether the latter is stationary and the former are moved, for example by means of vibrating mirrors or rotating prisms or pressure waves in a liquid or any other moving optical element;

(2) It is not necessary that the interceptor grating itself be photo-sensitive. The same result will be obtained if the photo-sensitive grating is replaced by a grating of evenly spaced opaque bars and slits and if the light falling through the latter is then collected on a photo-sensitive surface such as the cathode of a photocell of usual design;

(3) It is not a necessary feature of a device of the type proposed by me that the bars and slits of the interceptor grating be all of equal width, nor that the grating move with constant speed;

(4) It is not a necessary feature of such a device that the plane of the moving interceptor grating be vertical to the optical axis; nor is it necessary that the orientation of the bars and slits be at right angles to the optical axis of the imaging system or to the direction of movement of the grating. Other angles of orientation may offer particular advantages, excepting only orientations substantially parallel to the optical axis or to the direction of movement when intercepting the optical axis or to the plane formed by these two directions.

In all cases, the optical accuracy of discrimination of my new device is proportional to the diameter and to the focal length of the imaging lens 30. It will be noted that the accuracy decreases with increased object distance according to Equation 4 for the longitudinal magnification.

Thus, for instance, the accuracy required when focusing a photographic or television camera is related to the diameter and focal length of the camera lens by the same equations as the accuracy of my new device is related to the dimensions of its lens. Thus, the perfection with which a camera is kept in focus by my new device is approximately constant for moderately, and very, distant objects in any case and exactly constant even for close-ups if the focal length of the lens is chosen roughly equal to the focal length of the camera lens.

The modulation of the photoelectric current, called the signal, may be utilized in various ways. It may control audible or visual indication of object distance; or it may serve to control automatic equipment such as focusing servo motors. One example each of the following three typical applications will be described below in detail:

(1) An automatic fine-focusing device responding to unbalance of two signals produced by a pair of interceptor gratings, one in front and one behind the sharp image plane; this device is shown in Figs. 5, 6, 7, 8, and 9;

(2) An automatic ranging or focusing device measuring the time when an interceptor grating moving in a helical depth scanning motion passes through the plane of a sharp image; this device is shown in Figs. 10, 11, 12, 13, 14, and 15; and (3) An audible obstacle locator whose signal frequency varies with the distance of the objects whose image planes are intercepted. This device is shown in Figs. 16, 17, 18, 19, 20, and 21, illustrating a blind-aid device of this type.

(1) *Automatic fine-focusing device*

I have shown in Fig. 3 how an interceptor grating yields maximum signal when it is coplanar with a sharp image plane, and the less signal the further it is removed from it.

In a typical focusing device of the kind proposed by me, the light bundles are intercepted in two different image planes by two interceptors, such as the semi-circular vanes 46 and 47 carrying grating bars 48 and slits 49. Both vanes 46 and 47 are preferably mounted on a common spindle 50, displaced 180° in angle, as shown in Fig. 5.

The optical arrangement of such a focusing device consists, as shown in Fig. 6, of a lens 51, an image limiting diaphragm 52, the pair of semi-circular interceptor vanes 46 and 47 on the common spindle 50, and a photocell 53. This photocell 53 is followed by an amplifier 54 or an electron multiplier suitable for signal amplification.

The block diagram (Fig. 8), shows how the signals are utilized to control a focusing servomotor: There is provided an electronic switch 55 controlled in synchronism by the motor 56 driving the rotating interceptor vanes 46 and 47. This electronic switch 55 may feed the output of the signal amplifier 54 to two alternative signal channels 57, 58 in such a way that the signals due to the near interceptor vane 46 are fed to one amplifier and rectifier 57 and the signals due to the rear interceptor vane 47 to another, similar, amplifier and rectifier 58. Finally, the rectified outputs of these two rectifiers 57 and 58 may be fed, in opposing direction, to the two halves of the field winding of a direct current motor 59 whose rotor is supplied with constant power from an auxiliary power supply not shown in the drawing.

It will be evident that the motor 59 will remain at rest whenever there are no, or exactly equal, signal amplitudes fed to the opposing field coils. The motor 59 will turn, one way or the other, whenever one or the other signal is stronger, in proportion to the difference in amplitude of the two signals.

An automatic gain control, not shown in the drawings, may be combined with the signal amplifier 54 common to both channels. If, in particular, the output-to-input relation of this amplifier 54 is made to follow a logarithmic law, then a given depth of signal modulation of the total light received will always produce the same signal output amplitude regardless of the intensity of the average illumination.

Images may, in general, be considered as randomly distributed areas of contrasting brightness separated by more or less sharp edges. Vertical and horizontal edges are found somewhat more frequently than those of other angles. Focusing devices of the above described type are most responsive to contrasting edges parallel to the grating bars 48 moving across them. If the bars 48 of the interceptor gratings 46 and 47 are radial, as shown in Fig. 5, and if the axis of the interceptor rotation is vertically beneath (or above) the optical axis of lens 51, as assumed in Figs. 6 and 8, then the bars 48 are vertical and move laterally when intercepting the imaging light bundles. The device is then most responsive to vertical contrasting edges, less so to those that slant, and insensitive to those that are horizontal.

A modification of the interceptor gratings shown in Fig. 7 will serve to make the device equally responsive to both vertical and horizontal edges. In Fig. 7 I have shown in axial view a pair of semi-circular interceptor vanes 60 and 61 similar to those shown in Fig. 5. These vanes 60 and 61 differ, however, from those shown in Fig. 5 in that the bars are not radial but cross the radii of the vanes 60 and 61 under an angle of about 45°. Moreover, each vane is divided into two halves, with the bars 62 of one half inclined +45° and the bars 63 of the other half inclined —45°, relative to the radii of the vanes 60 and 61.

Furthermore, the axis of rotation of these vanes 60 and 61 is displaced so as to lie in a plane that forms an angle of 45° with the vertical plane through the optical axis of lens 51. The optical axis thus passes through the interceptor vanes at a point 64 with an angle of 45° between its radius and the vertical. It will be evident that in such an arrangement one half of the bars of each vane are vertical when they move across the optical axis at 64 and the other half will be horizontally oriented. Correspondingly, each of the two signals periods, one for each vane, will be subdivided into a period of vertical and a period of horizontal response. Since, for bars of equal width and constant speed of rotation, an equal number of bars crosses the optical axis in each unit of time, the signal frequency will be the same for all four quadrants.

In the two-vane device described above, the rotation of the motor 59 is controlled proportionally to the difference between the two signals passing through the amplifier 57 and 58, respectively. If the planes of both interceptor vanes are moved along the optical axis past an image plane, then at first one, then the other signal voltage, $E_{p1}$ and $E_{p2}$ respectively, will pass through a maximum, such as shown at 44 and 45. In Fig. 9, the curves $E_{p1}$ and $E_{p2}$ represent these individual signal voltages as functions of the position $b$ along the optical axis. These individual voltages are plotted with opposite sign since they are applied to the motor field windings in opposite sense; the spacing between the peaks is equal to the spacing of the interceptor vanes 46 and 47 on their spindle 50. The resulting differential voltage controlling the motor is $E_p = E_{p1} - E_{p2}$ which, as also shown in Fig. 9, reverses its polarity midway between the peaks. Assumed that the so controlled motor 59 is coupled to the focusing adjustment of the lens 51 in such a way that a positive signal $E_p$ will shift the image plane towards the plane of the interceptor causing the negative signal $E_{p1}$, and vice versa, then, evidently, the motor 59 must come to rest when the image plane has moved to the midpoint where $E_p$ reverses its polarity. Such a focusing device thus tends to stay focused by holding the image plane in focus midway between the interceptor planes. If the focusing control of any other device, such as a camera, is also coupled to the thus controlled motor 59, then the camera lens may be held focused too.

This device will focus automatically only if the image plane was initially within the usable range near, or between the two interceptor vanes; in that case the difference voltage $E_p$ will be the larger, and the focus restoring motion the faster, the further distant the image plane is from the midpoint. If, however, the image plane is well outside the two peaks of the curve $E_p$, the focus restoring signal may still be of the right polarity but will be increasingly feeble, making for progressively slower focusing.

The spacing of the two interceptor vanes on their spindle may be adjustable. The wider the spacing, the larger is the range over which the device will operate. But the further the peaks are moved apart, the weaker will be the signals $E_p$ close to the exact focus. This device is thus most efficient when coverage of a moderate range of distance is required, such as in fine-focusing within a prefocused range.

(2) *Automatic range finder and focus controlling device*

A second type of automatic range finder and focus controlling device according to my present invention does not merely correct the focusing errors, but actually measures the distance of the objects within its angle of acceptance. If there are several such objects, the distance of one of them, either falling within a predetermined range or the closest distance, may be selected and indicated by the device. It is, however, also possible to display a plot of all signals as simultaneous ranging record or to adjust automatically the range of another device, such as a camera, to one of these distances. If the device is used in conjunction with a camera, it will preferably be designed for a relatively narrow angle of acceptance, thus covering only a small part of the picture area. The so designed device might be mounted rotatably on the camera and pointed to a selected object such as a person's face.

The essential feature of the device will be understood from Fig. 10 which is similar to Fig. 3 in that it shows two imaging light bundles near their image planes 65 and 66. These imaging light bundles may be intercepted by an interceptor grating 67 moving across them in the direction of the arrow 68. The grating 67, consisting preferably of opaque bars and clear interstices, all of equal width, may be slanted or curved as shown in Fig. 10.

In the course of its movement, this interceptor grating will then intercept the optical axis 69 at one image plane after another, beginning with the images of the nearest objects, near 65, then intercepting the images of more distant objects and finally those of infinitely distant ones at $b\infty$ to the left of image plane 66. The angle between the plane of the grating 67 and the image planes may be kept small so that they may be considered coplanar over the area of the images. Alternatively, an interceptor grating 70 may be used which is kept substantially parallel to the image planes but the direction of its movement is tilted, as indicated by arrow 71 in Fig. 10; in case the interceptor grating 70 forms a curved or twisted surface, at least the part near the optical axis 59 may be held substantially parallel to the image planes.

Fig. 11 shows an interceptor grating, formed as a single-turn helical vane 72 supported by a motor driven spindle 73. The opaque bars 74 and slits 75 are radial and the pitch $p$ of this vane is so chosen that the slotted zone of the vane will scan the image space from the image plane 65 at $b_0$ of the nearest rangeable object to $b\infty$, the image distance of infinitely distant objects; therefore, pitch $p = b_0 - b\infty$. Thus, once during each rotation, a signal peak will occur each time the bars of the vane 72 intercept the optical axis at the sharp image of an imaged object.

The whole range of image planes will be explored twice per rotation of the interceptor if a pair of semi-circular helical vanes 76 and 77 is used, as shown in Fig. 12, each vane having twice the pitch of the helix shown in Fig. 11 and thus covering the range from $b_0$ to $b\infty$ within 180° of rotation. The arrangement of the two semi-circular vanes 76 and 77 is particularly advantageous if my new range finder is to be sensitive to both vertical and horizontal contrasting edges. In this case, the two sets of radial bars and slits shown in Fig. 12 are replaced by one set each of bars and slits tilted against the radii of the vanes by an angle of +45° and an angle of −45°, respectively; and the axis of rotation of the vanes is displaced 45° from the vertical plane through the optical axis, as shown in Fig. 13, similar to Fig. 7.

The light falling through these interceptor vanes is collected on a photocell cathode as described above. An object having both vertical and horizontal contrasting edges will then yield two signal peaks, not necessarily of equal height, per rotation of the interceptor, 180° displaced from each other. Fig. 14 shows the alternating signal peaks 78 and 79 due to a single object as voltages $E_g$ as a function of the time $t$. Their height is indicative of the depth of light modulation; their position along the time axis indicates when, during the rotation of the interceptor vanes, the sharp image was met. Since a given bar of the helical vane intercepts the optical axis always at the same image plane, the angular position of the vanes at the moment of the signal peak identifies the image plane and thus the distance of the object imaged there. Also, if the start of each vane at $b_0$ is marked by timing pulses 80, such as are shown with negative polarity in Fig. 14, then the delay of the signal pulses 78 and 79 after each timing pulse 80 is a measure of the distance of the imaged object.

Signals due to only one object are shown in Fig. 14; but a number of objects will yield a like number of signal pulses per scan, the nearest object being indicated first if the scan is from $b°$ to $b\infty$.

Foreground objects such as fences and the background may be barred from activating the range finder, just as are objects outside its diaphragm-limited angle of acceptance. To this end, the timing pulses may also activate an electronic switch that opens the signal channel only after a predetermined delay after each timing pulse and only for a predetermined duration. By this procedure, known in the art as "gating," only such signal pulses will be indicated that occur within a desired time interval of each scan, corresponding to the desired range of object distances.

The photoelectric currents representing the signal pulses may be amplified in an amplifier and rectified, or intensified in a photocell-multiplier, preferably with a logarithmic output-to-input relation to obviate the need of a gain control. The signal peaks may then be smoothed by a low-pass filter that eliminates the signal frequency and its harmonics. After passing through the gating circuit, the signals may then be used to activate any of the servo mechanisms known in the art, or they may be displayed visually, e. g. on a cathode ray oscilloscope.

Fig. 15 exemplifies another application, namely a device designed to show on a meter scale the distance of the nearest object within a given range of distances. In this device, the motor 81 turning the interceptor spindle 73 with vanes 76 and 77, also operates a synchronized pulse generator 83 each time an interceptor vane starts at $b_0$ to scan the image space. The photoelectric currents obtained by the photoelectric cell 84 are amplified and rectified in a photocell-multiplier 85 as explained above. The signal peaks are then smoothed by a low-pass filter 86 and the output of this filter 86 is fed via the gating circuit 82 to the grid 87 of a grid-controlled gas discharge tube 88. This tube 88 is fired each time the signal pulses reach the firing potential $E_t$, marked in Fig. 14. To the anode of this gas discharge tube 88 are fed steep negative quenching pulses from the synchronized pulse generator 83. Thus, the tube is extinguished each time one of the interceptor vanes 76 and 77 starts at $b_0$, as marked "On-Off" in Fig. 14. It will be seen that the tube is "On" the longer the earlier it is fired by the signals, that is the nearer the nearest obstacle. The average anode current of the tube is proportional to the duration of the "On" periods; it may be smoothed by a choke 89 and condenser filter 90 and measured by a D. C. meter 91 inserted in the D. C. path between the choke 89 and the anode voltage supply. The meter 91 may be directly calibrated in distance of the nearest obstacle.

(3) Audible Obstacle Locator

Another typical embodiment of my present invention is a small portable obstacle locator, in particular to be used for guiding blind people trained in its use. The purpose of this device is to give audible indication of all obstacles in the direction to which it is pointed, particularly in the range from about 2 to 25 feet.

Such a device should make all possible use of the operator's handling skill and auditory discrimination. Its design is, however, subject to rigorous limitations in size and weight, simplicity of all parts, and to easily audible signal frequencies.

As in the above described devices, the image space is periodically scanned in depth for presence of sharp optical images by a moving interceptor grating 92 shown in Fig. 16. This interceptor grating 92 consists of opaque bars alternating with slits of the same width and is oriented under an angle relative to the image planes and moved around an axis parallel to the optical axis, as indicated by arrow 93. Alternatively, the plane of the interceptor bars may be substantially parallel to the image planes shown for the interceptor as indicated by numeral 94 and the axis of rotation may then be tilted relative to the optical axis as indicated by arrow 95. In either case, the grating will intercept the optical axis 96 in one image plane after another, scanning it, in the example shown in Fig. 16, from $b\infty$ at the left to $b_0$ at the right.

It is an essential feature of this type of interceptor vane that it identifies the location of any sharp image by a characteristic signal frequency. This frequency may, for example, be 1000 c./sec. for the image plane at $b\infty$ for the most distant objects and rise steadily with nearer objects to, perhaps, 2000 c./sec. for the image plane at $b_0$ of objects only 20" away. This identification might be achieved in different ways:

(1) The width and spacing of the intercepting grating bars and slits are steadily reduced from wide at that part of the vane that intercepts the image planes near $b\infty$ to narrow at that part of the vane that intercepts the image planes near $b_0$; or (2) The velocity of lateral movement of the interceptor is steadily increased from slow when it intercepts the image planes near $b\infty$ to fast when it intercepts the optical axis near $b_0$; or (3) Any combination of both varying width and varying velocity of interceptor movement may be utilized. Furthermore, the vane or its path may be curved so as to allot other than linear proportions of the whole scanning period to the different depth zones of the image space; in this way, certain ranges of object distances requiring more thorough scrutiny may be favored above others.

A combination of varying bar width, a curved vane, and varying velocity of movement is exemplified by the interceptor vane 97 shown in Fig. 17. This vane 97 is mounted on a spindle 98 of thin wire, stretched between clamped ends, and thus capable of torsional oscillations indicated by arrows 99. The motion of the interceptor vane 97 is insensitive to external acceleration as the vane is counterbalanced by an opposite arm 100 carrying two pairs of contacts 101 and 102 and a plate of soft iron 103 to be discussed later. The vane 97 is designed to oscillate in approximately sinusoidal motion across the imaging bundle of light intercepting it at all times, either with the wide bars 104 at one edge, or with the narrow bars 105 at the other edge. The vane 97 is so twisted that with each full oscillation across the optical axis 96 it also scans along it, from $b\infty$ to $b_0$ and back. With the velocity of the vane substantially the same, though with alternating direction, whenever it intercepts any given image plane, any intercepted image will cause the same signal frequency on both strokes, and this frequency is thus unambiguously indicative of a certain object distance. Objects at different distances will each in turn be indicated by the signal frequency characteristic for their distance.

As in the other devices described above, the light passing through the interceptor vane 97 is received by a photocell 106 and the photoelectric currents so produced are intensified in a photocell-multiplier 107 as shown in Fig. 18. The audio-frequency output of this multiplier 107 may, if necessary, be further amplified in an audio-frequency amplifier, not shown, and is then fed, via a transformer 109, to a headphone 110. This headphone 110 may be an earplug similar to those used in hearing aid devices or it may be attached to the ear in such a way that it can be heard without plugging the ear to other sounds.

The lens 111, the intercepting vane 97, the photocell 106, the electronmultiplier 107, the audio transformer 109 and the headphone 110 make up the specific components of a blind-aid device according to my invention. In addition to these parts there are required a suitable source of high voltage for the photomultiplier 107, an exciter for the interceptor oscillations, a switch and an automatic gain control.

A schematic circuit diagram of the whole device is shown in Fig. 18. The source of all power is a drycell battery 112 of, perhaps, 1.5 volts. When the button switch 114 is closed, the battery current flows through one of the vibrator coils 116 and one of the contacts 101, the vibrator spindle 98 and the suspension, and through the power transformer primary winding 117 to the other pole of the battery. There are two vibrator coils 116 and contacts 101, alternately used and connected in such a way that magnetizing current flows through one of the coils 116 whenever the opposite contact 101 is closed, causing attraction of the plate 103 of soft iron attached to the vibrator and so breaking the contact. The battery circuit is then closed again at the other end of the oscillation, etc. maintaining the vibrator in oscillation. Whenever one of the vibrator contacts 101 is closed, the whole battery current flows through the primary low-impedance winding 117 of the power transformer 118. As is well known, a relatively high voltage is built up on the winding 117 whenever the current is interrupted. Simultaneously, on the secondary transformer winding 119 a very high voltage peak occurs, stepped up in proportion to the large turns ratio of the two windings. This voltage peak may be tuned to a maximum by resonating the primary winding inductance with a condenser 120. The high secondary voltage peaks are rectified by means of a stack of contact rectifiers 121 acting as a half-wave rectifier and the so obtained high D. C. voltage is smoothed by means of the filter condenser 122.

The high D. C. voltage is fed to all stages of a multistage photocell-electronmultiplier 107 via a resistive voltage divider 123. It is desirable that all dynode stages of the multiplier 107 be fed with approximately equal dynode potentials, regardless of the total potential and of varying dynode current load. It is further desirable to keep small any resistances in series with each dynode and common to both the circuits in which the dynode is anode, and cathode, respectively; a relative large resistance in such place may cause instability. Both these requirements could be satisfied by use of a voltage divider 123 of relatively low impedance; but such choice would entail useless dissipation of energy as is most undesirable in a portable battery-fed device.

I therefore propose to use a two-dimensional resistive voltage divider 123 of relatively high impedance. Such a device may be made from a tapered sheet of resistive material, with terminals inserted at suitable points. As shown in Fig. 20, the positive terminal may be placed at the top of the taper while the negative potentials may be applied to a conducting edge along the bottom of the taper. The equipotential lines of one tenth, two tenth ... of the total potential may be plotted as shown as dotted lines in Fig. 20 and labeled $E_1$; $E_2$; ... to $E_9$. If equal potential differences, each one tenth of the total, are to be tapped off such a voltage divided, then the terminal for each tap must obviously lie on one of the equipotential lines shown; as long as all load currents are negligible, any point on a given equipotential line will serve equally well. If, however, load currents are drawn from the voltage divider, then its source impedance can no longer be ignored. The source impedance for a load between points $E_n$ and $E_{n+1}$ is the resistance between these two tapping points and thus the larger the further they are spaced from another. Consideration of a tapered voltage divider will make it obvious that equipotential lines must be the wider spaced the further they are removed from the top of the taper, in direct proportion to the width of the taper. Also, if the tapping points are placed along the curved edge of the taper, as shown in Fig. 20, then the separation between any two of them, that is the source impedance presented to that particular load, can be still further increased towards the wide end of the taper. This device thus represents a voltage divider from which substantially equal voltages may be derived from the dynodes of a multistage electron multiplier with the source impedances decreasing towards the latter, more positive, dynodes, according to any desired law. Since in an electron multiplier the load currents increase in each dynode stage by the secondary-emission factor, the load impedances decrease accordingly. Thus, if the source impedances decrease in the same proportion the dynode potential will remain approximately the same for all stages even if the load currents are relatively large, compared with the current wasted in the voltage divider itself.

An important feature of a blind-aid device must be its ability to operate under widely varying illumination. For use in poor light, the device should be as highly sensitive as possible. If the device were exposed to strong illumination with undiminished sensitivity, the currents in later stages of the electron multiplier would be enormous. Fortunately, a high voltage supply of the described type has so high a source impedance that a certain degree of automatic gain control is provided by that, the gain of an $n$-stage multiplier being proportional to about the $(n/2)$th power of the total voltage supplied. To assist the drop in supplied voltage with increase of load current, the high-voltage supply may be additionally loaded by an impedance that is controlled by the ambient light. To this end, the diaphragm 124 in front of the interceptor vane 97 may be coated with a light sensitive conductor such as selenium as indicated by numeral 125. The so obtained photo-sensitive shunt is then connected across the smoothing condenser 122, reducing the voltage supplied to the electron multiplier 107 the more the stronger the diaphragm is illuminated by light from the direction to which the device is pointed.

The button switch 114, pressed to operate the device, may be located near the diaphragm; it may have, on its movable contact, an extension 108 acting as shutter so arranged that the hole of the diaphragm 124 is exposed to light only when the button 114 is pressed, and covered when the device is not used. Very bright sources of light such as the sun, accidentally pointed at, can then not damage the photocell cathode unless the device is in use and can issue a loud warning signal.

In order to save in the size of the high-voltage smoothing condenser 122 a moderate decay of the high voltage between charging pulses may be tolerated. This would, however, add to the signals a buzzing noise due to the harmonics of the vibrator frequency. To eliminate this disturbance, an auxiliary pair of contacts 102 is provided on the vibrator arm 100 that shortcircuits the headphone 110 just before the main vibrator contacts 101 are closed and do not open again until the condenser charging pulses are completed. The vibrator frequency itself and its second harmonic may be kept below the range of the audio output transformer 109.

To supplement this outline of the components and their method of operation, a few numerical data may be given by way of example. The basically wide choice of parameters is narrowed by the following considerations:

(1) The range of the device should extend from arms length, i. e., 0.5 meter (20″) to infinity, but distances of 8 meters (about 27 feet) and beyond need not be distinguished from each other;

(2) In order to avoid misinterpretation due to harmonic relation between different signals, their range should not exceed one octave;

(3) In a handy device, the lens should not have a diameter of more than one inch nor a focal length of more than two inches;

(4) The signal frequencies should be easily recognizable even to older people, thus not range far above 2000 c/sec.;

(5) The repetition rate of exploration should be so rapid that slow and steady pointing is not needed and that usual moving objects are recognized as such. It appears desirable that the train of signals for each depth scan should resemble in duration a spoken syllable, thus last for about 0.1 to 0.2 second;

(6) The repetition rate of depth scan should not be a fraction of any of the usual power frequencies, such as 50 or 60 c/sec., so as to avoid slow beats between signals and hum due to power frequency flicker of artificial light sources.

The following approximate parameters are thus assumed: The lens 111 may have a diameter of 2.5 cms., a focal length of 5.—cms., thus a numerical aperture of F:2. For an angle of acceptance of 1°, that is about one inch at five feet, the lens must give a sharp image only over a field of less than 0.1 cm. diameter. Even a simple, projection-type lens combination will cover such a field with a circle of confusion of less than 0.0025 cm. diameter.

The diaphragm 124, if spaced about 0.3 cm. in front of the midplane of the interceptor vane 97, will have an opening of about 0.2 cm. diameter. The radial dimensions of the interceptor bars and slits need not exceed 0.2 cm. The area of the photocell cathode 106, spaced as much as 1.—cm. beyond the interceptor vane 97, should then cover a field of perhaps 0.6 cm. diameter.

The maximum signal amplification in the photocell multiplier 107 should be as high as is possible in a compact and stable device. Taking presently available nine-stage multipliers as standard, a current amplification of $10^7$ can be had with a total supply voltage of about 1000 volts. With a maximum sensitivity of at least one ampere per lumen thus available, an illumination of 100 microlumens on the photocell will yield an output current of 0.1 milliampere. Assuming a signal component corresponding to a depth of modulation of 10%, and no further audio amplification, a signal curent of 100 microamperes will flow through the primary winding 126 of the output transformer 109. This winding may easily be given enough inductance to present to the tube a load impedance of 100,000 ohms for frequencies above 1000 c/sec. Thus, a signal of $10^{-5}$ watts will be delivered to the headphone 110. If stronger signal output and still less depth of signal modulation are contemplated, then further stages of electron multiplication are impractical on account of the large standing current required. A single stage A. C. coupled audio amplification, not shown in the diagram, may then be added, also fed from the same battery 112 and power supply, with only slight increase in current drain. The power supply may deliver up to 1200 volts D. C. with a load current of about 0.2 milliampere, a maximum load of about 1/4 watts. To save heater current required by a rectifier tube, a stack of 50 selenium rectifiers 121 may be used; if each disc of about 1/2" diameter is about 0.020" thick, then the whole unit will be about one inch long. An overall efficiency of 20% has been easily obtained with small vibrator type power supplies of this type; thus, the average current drain on a 1.5 volt cell can be taken as less than one ampere.

The design of the interceptor vane is based on a width of the thinnest bar equal to the diameter of the circle of confusion, 0.0025 cm. If the highest signal frequency, caused by this bar, is to be 2000 c./sec., then the speed of the vane across the optical axis must be $v = f/n$ that is $$\frac{2000}{20} = 10 \text{ cms./sec}$$

If the nearest rangeable object is to be 20" distant, i. e. 0.5 meter, then for a focal length of $b_\infty = 5.0$ cms., the value of $b_0$ is 5.55 cms. and thus the depth of the image space to be scanned becomes 0.55 cm. The interceptor vane 97 is so to be moved across the optical axis that the edge with the widest bars 104 is 0.55 cm. nearer to the diaphragm 124 than the edge with the narrowest bars 105; in that case, the signal frequency is the higher the nearer the object.

A suitable repetition frequency of the depth scan is 8 c./sec.; the whole scanning movement then lasts 125 milliseconds. The periods of low and reversing speed at both ends of the swing are utilized for recharging the high-voltage supply; the headphone 110 may thus be shortcircuited for 25 milliseconds at each end of the swing. Between these reversing periods, the motion of an approximately sinusoidal oscillator may be taken as of very nearly constant speed. The vane 97 covers the range from $b_\infty$ to $b_0$ during the forward stroke, the same range in reverse direction on the return stroke, each time in about 30% of the period of 125 milliseconds, that is 37.5 milliseconds.

With signal frequencies covering the range from 1000 c./sec. to 2000 c./sec., the average may be taken as 1400 c./sec., with a period of about 0.7 millisecond. Thus, at most about 50 signal oscillations can be heard during each stroke of 37.5 milliseconds. Arbitrarily dividing the explored object space into four zones, from 0.5 to 1.—; from 1.— to 2.—; from 2.— to 4.—; and from 4.— meters to infinity, there are about 12 signal frequency oscillations allotted to each zone, covering in each a frequency range of 1.18 to 1.—.

From the speed of lateral movement of 10 cms./sec. and the duration of the stroke of 37.5 milliseconds follows the used length of the lateral path of the vane as 0.375 cm. Compared with the required path of the vane along the optical axis of 0.55 cm., this lateral path would require a very sharply twisted vane if the axis of rotation were parallel to the optical axis; the resulting large angle of vane is not desirable with wide-aperture bundles of light as assumed here. One or both of the following modifications as shown in Fig. 19 are thus suggested:

(1) The axis of rotation 127 of the vane is turned relative to the optical axis 96 until the vane 128 is approximately parallel to the image planes wherever it intercepts the optical axis;

(2) The bars 129 and slits 130 of the vane 128 may be turned around the optical axis until they form with the direction 131 of lateral movement an acute angle $a$ instead of a right angle. The width of each bar and slit may be the same as assumed before, i. e. 0.0025 cm. for the narrowest ones.

Then, for unchanged speed of lateral movement, the time for each bar to cross the optical axis 96 is increased by $1/\sin a$; for example, the time is doubled for an angle $a = 30°$. Alternatively, if the time for each bar is maintained so as to produce the same signal frequencies as stipulated originally, then the speed of motion is halved and thus the lateral path of the vane is doubled, making for easier design. If this procedure is adapted, the axis of rotation of the vane is to be swung around the optical axis by $(90° - a)$ so that the slits and bars are oriented as before relation to contrasting edges in the image they cross.

A device comprising the enumerated parts except the headphone can easily be built into a handheld case 132 as shown in Figs. 21 and 22 with the major components outlined. Turning of this device by 90° will tell vertical from horizontal edges.

It will be understood that each of the elements described above, or two or more together, may also find a useful application in other types of automatic range determining and similar devices and apparatus, differing from the types described above.

While I have illustrated and described the invention as embodied in automatic focusing, range finding and obstacle locating, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim as new and desire to secure by Letters Patent is:

1. In an apparatus of the character described in combination an optical imaging system for imaging objects, said optical imaging system having an optical axis and an exit focal plane; photo-sensitive means having a photo-sensitive surface positioned to receive imaging light bundles after the same have passed through said optical imaging system substantially in direction of said optical axis of the same and arranged spaced from said exit focal plane of said optical imaging system, thus forming an image space between itself and said exit focal plane; and at least one partly opaque light intercepting means having light intercepting elements of a size of the order of the diameter of the circle of confusion of the images formed by said optical imaging system and movably located in said image space for periodically intercepting each of the rays of said imaging light bundles after the same have passed through said optical imaging system substantially in direction of said optical axis of the same in at least two image planes of said image space before said imaging light bundles are received by said photo-sensitive surface of said photo-sensitive means, whereby the output of said photo-sensitive means depends on the distance of the imaged objects from said optical imaging system.

2. In an apparatus of the character described in combination an optical imaging system for imaging objects, said optical imaging system having an optical axis and an exit focal plane; photo-sensitive means having a photo-sensitive surface positioned to receive imaging light bundles after the same have passed through said optical imaging system substantially in direction of said optical axis of the same and arranged spaced from said exit focal plane of said optical imaging system, thus forming an image space between itself and said exit focal plane; and at least one light intercepting grating means consisting of opaque bars and transparent slits of a width of the order of the diameter of the circle of confusion of the images formed by said optical imaging system, said light intercepting grating means movably located in said image space for periodically intercepting each of the rays of said light bundles after the same have passed through said optical imaging system substantially in direction of said optical axis of the same in at least two image planes of said image space, whereby the output of said photo-sensitive means depends on the distance of the imaged objects from said optical imaging system.

3. In an apparatus of the character described in combination an optical imaging system for imaging objects, said optical imaging system having an optical axis and an exit focal plane; photo-sensitive means having a photo-sensitive surface positioned to receive imaging light bundles after the same have passed through said optical imaging system substantially in direction of said optical axis of the same and arranged spaced from said exit focal plane of said optical imaging system, thus forming an image space between itself and said exit focal plane; and at least one partly opaque light intercepting means having light intercepting elements of a size of the order of the diameter of the circle of confusion of the images formed by said optical imaging system and movably located in said image space for periodically intercepting each of the rays of said imaging light bundles after the same have passed through said optical imaging system substantially in direction of said optical axis of the same alternatingly in at least two image planes of said image space, whereby the output of said photo-sensitive means depends on the distance of the imaged objects from said optical imaging system.

4. In an apparatus of the character described in combination an optical imaging system for imaging objects, said optical imaging system having an optical axis and an exit focal plane; photo-sensitive means having a photo-sensitive surface positioned to receive imaging light bundles after the same have passed through said optical imaging system substantially in direction of said optical axis of the same and arranged spaced from said exit focal plane of said optical imaging system, thus forming an image space between itself and said exit focal plane; and at least one partly opaque light intercepting means having intercepting elements of a size of the order of the diameter of the circle of confusion of the images formed by said optical imaging system and movably located in said image space and combined of at least two light intercepting portions each of which periodically intercepts each of the rays of said light bundles after the same have passed through said optical imaging system substantially in direction of said optical axis of the same in one image plane of said image space, whereby the output of said photo-sensitive means depends on the distance of the imaged objects from said optical imaging system.

5. In an apparatus of the character described in combination an optical imaging system for imaging objects, said optical imaging system having an optical axis and an exit focal plane; photo-sensitive means having a photo-sensitive surface positioned to receive imaging light bundles after the same have passed through said optical imaging system substantially in direction of said optical axis of the same and arranged spaced from said exit focal plane of said optical imaging system, thus forming an image space between itself and said exit focal plane; and at least one partly opaque light intercepting means having intercepting elements of a size of the order of the diameter of the circle of confusion of the images formed by said optical imaging system and movably located within said image space for periodically intercepting said imaging light bundles after the same have passed through said optical imaging system substantially in direction of said optical axis of the same in one image plane after another within a predetermined range of said image space, whereby the output of said photo-sensitive means depends on the distance of the imaged objects from said optical imaging system.

6. In an apparatus of the character described in combination an optical imaging system for imaging objects, said optical imaging system having an optical axis and an exit focal plane; photo-sensitive means having a photo-sensitive surface adapted to receive imaging light bundles after the same have passed through said optical imaging system substantially in direction of said optical axis of the same and positioned spaced from said exit focal plane of said optical imaging system, thus forming an image space between itself and said exit focal plane; and at least one partly opaque light intercepting member having intercepting elements of a size of the order of the diameter of the circle of confusion of the images formed by said optical imaging system and composed of a great number of light intercepting portions movably located within said image space for periodically intercepting each of the rays of said imaging light bundles after the same have passed through said optical imaging system substantially in direction of said optical axis of the same in different image planes within a predetermined range of said image space, whereby the output of said photo-sensitive means depends on the distance of the imaged objects from said optical imaging system.

7. In an apparatus of the character described in combination an optical imaging system for imaging objects, said optical imaging system having an optical axis and an exit focal plane; photo-sensitive means having a photo-sensitive surface positioned to receive imaging light bundles after the same have passed through said optical imaging system substantially in direction of said optical axis of the same and arranged spaced from said exit focal plane of said optical imaging system, thus forming an image space between itself and said exit focal plane; at least one partly opaque light intercepting means having light intercepting elements of a size of the order of the diameter of the circle of confusion of the images formed by said optical imaging system and movably located in said image space for periodically intercepting each of the rays of said imaging light bundles after the same have passed through said optical imaging system substantially in direction of said optical axis of the same alternatingly in at least two predetermined image planes of said image space, whereby the output of said photo-sensitive means depends on the distance of the imaged objects from said optical imaging system; and adjusting means actuated by the photo-electric current modulations of said photo-sensitive means caused by intercepting the imaging light bundles by said light intercepting means in said two image planes and automatically moving said light intercepting means along the optical axis of said optical imaging member in such position that the image plane of an object being ranged is permanently located between said two image planes periodically intercepted by said light intercepting means.

8. In an apparatus of the character described in combination an optical imaging system for imaging objects, said optical imaging system having an optical axis and an exit focal plane; photo-sensitive means having a photo-sensitive surface positioned to receive imaging light bundles after the same have passed through said optical imaging system substantially in direction of said optical axis of the same and arranged spaced from said exit focal plane of said optical imaging system, thus forming an image space between itself and said exit focal plane; and at least one partly opaque light intercepting member movably located in said image space and combined of at least two light intercepting portions each having light intercepting elements of a size of the order of the diameter of confusion of the images formed by said optical imaging system, each of said light intercepting portions periodically intercepting in one image plane of said image space each of the rays of said imaging light bundles after the same have passed through said optical imaging system substantially in direction of said optical axis of the same and said light intercepting portions arranged relative to each other so as to alternatingly intercept the rays of said imaging light bundles before said imaging light bundles are received by said photo-sensitive surface of said photo-sensitive means, whereby the output of said photo-sensitive means depends on the distance of the imaged objects from said optical imaging system.

HEINZ E. KALLMANN.

REFERENCES CITED

The following references are of record in the file of this patent:

UNITED STATES PATENTS

| Number | Name | Date |
|---|---|---|
| 1,934,484 | Camilli | Nov. 7, 1933 |
| 1,959,044 | Wallace | May 15, 1944 |
| 2,058,532 | Tuttle | Oct. 27, 1936 |
| 2,082,093 | Bedford | June 1, 1937 |
| 2,411,741 | Michaelson | Nov. 26, 1946 |

OTHER REFERENCES

Electronics, March 1946, pages 116–119.